(12) United States Patent
Bui et al.

(10) Patent No.: US 11,972,783 B1
(45) Date of Patent: Apr. 30, 2024

(54) MAGNETIC RECORDING TAPE HAVING SERVO PATTERN FOR TAPE DIMENSIONAL STABILITY COMPENSATION VIA HEAD SKEW

(71) Applicant: International Business Machines Corporation, Armonk, NY (US)

(72) Inventors: Nhan Xuan Bui, Tucson, AZ (US); Kevin Bruce Judd, Tucson, AZ (US); Simeon Furrer, Altdorf (CH); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/127,946

(22) Filed: Mar. 29, 2023

(51) Int. Cl.
| | |
|---|---|
| *G11B 5/584* | (2006.01) |
| *G11B 5/008* | (2006.01) |
| *G11B 5/56* | (2006.01) |
| *G11B 5/592* | (2006.01) |
| *G11B 5/596* | (2006.01) |
| *G11B 33/02* | (2006.01) |

(52) U.S. Cl.
CPC ...... *G11B 5/59633* (2013.01); *G11B 5/00813* (2013.01); *G11B 5/56* (2013.01); *G11B 5/59688* (2013.01); *G11B 33/022* (2013.01)

(58) Field of Classification Search
CPC ... G11B 5/5926; G11B 27/19; G11B 20/1209; G11B 5/588; G11B 5/08117; G11B 5/54; G11B 5/5539; G11B 20/20; G11B 5/00873; G11B 5/584; G11B 5/5543

USPC .................................................... 360/77.12
See application file for complete search history.

(56) References Cited

U.S. PATENT DOCUMENTS

| | | | |
|---|---|---|---|
| 5,689,384 A | 11/1997 | Albrecht et al. | |
| 6,222,698 B1 | 4/2001 | Barndt et al. | |
| 7,881,008 B2 | 2/2011 | Cherubini et al. | |
| 8,089,716 B2 | 1/2012 | Takayama et al. | |
| 8,705,199 B2 | 4/2014 | Saliba et al. | |
| 9,251,825 B2 | 2/2016 | Biskeborn et al. | |
| 9,324,350 B2 | 4/2016 | Biskeborn et al. | |
| 9,633,681 B1 | 4/2017 | Cherubini et al. | |
| 10,366,716 B1 * | 7/2019 | Judd .................... | G11B 5/588 |
| 2021/0125633 A1 | 4/2021 | Jurneke | |
| 2022/0108718 A1 | 4/2022 | Bui et al. | |

FOREIGN PATENT DOCUMENTS

WO    2022070961 A1    4/2022

* cited by examiner

*Primary Examiner* — Nabil Z Hindi
(74) *Attorney, Agent, or Firm* — Zilka-Kotab, P.C.

(57) ABSTRACT

In one general embodiment, a data storage product includes a magnetic recording tape having written thereon at least two servo tracks extending along a longitudinal axis of the tape. Each servo track has a timing-based servo (TBS) pattern comprising a series of servo frames arranged to enable lateral positioning of a magnetic head relative to the servo tracks as well as tape dimensional stability (TDS) compensation via head skew. Each frame comprises a sequence of pairs of leading and trailing servo stripes. Midpoints between the servo stripes in each pair, at all points having a same relative lateral height on the tape, are located along a virtual median line oriented at an angle β from perpendicular to the longitudinal axis of the tape, the angle β being greater than 1 degree.

19 Claims, 15 Drawing Sheets

MAGNETIC RECORDING TAPE HAVING SERVO PATTERN FOR TAPE DIMENSIONAL STABILITY COMPENSATION VIA HEAD SKEW

BACKGROUND

The present invention relates to data storage systems, and more particularly, this invention relates to magnetic recording tape media having a servo pattern that enables tape dimensional stability compensation via head skew.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

A data storage product, in accordance with one embodiment, includes a magnetic recording tape having written thereon at least two servo tracks extending along a longitudinal axis of the tape. Each servo track has a timing-based servo (TBS) pattern comprising a series of servo frames arranged to enable lateral positioning of a magnetic head relative to the servo tracks as well as tape dimensional stability (TDS) compensation via head skew. Each frame comprises a sequence of pairs of leading and trailing servo stripes. Midpoints between the servo stripes in each pair, at all points having a same relative lateral height on the tape, are located along a virtual median line oriented at an angle $\beta$ from perpendicular to the longitudinal axis of the tape, the angle $\beta$ being greater than 1 degree.

An apparatus for writing servo tracks on a magnetic recording tape, in accordance with one embodiment, includes a servo write head having at least two write transducers positioned and configured to write parallel servo tracks along a longitudinal axis of the magnetic recording tape. Each resulting servo track has a timing-based servo (TBS) pattern comprising a series of servo frames arranged to enable lateral positioning of a magnetic head relative to the servo tracks as well as tape dimensional stability (TDS) compensation via head skew. Each frame comprises a sequence of pairs of leading and trailing servo stripes. Midpoints between the servo stripes in each pair, at all points having a same relative lateral height on the tape, are located along a virtual median line oriented at an angle $\beta$ from perpendicular to the longitudinal axis of the tape, the angle $\beta$ being greater than 1 degree.

An apparatus for performing data operations on a magnetic recording tape, in accordance with one embodiment, includes a magnetic head having at least two servo transducers positioned and configured to read parallel servo tracks extending along a longitudinal axis of the magnetic recording tape, the magnetic head also having an array of data transducers for performing data operations on the magnetic recording tape. A controller is in communication with the magnetic head, and is configured to perform lateral positioning of the magnetic head relative to the servo tracks as well as perform tape dimensional stability (TDS) compensation via head skew based on signals from the servo transducer reading timing-based servo (TBS) patterns of the servo tracks. Each servo track comprises a series of servo frames arranged to enable the lateral positioning of a magnetic head relative to the servo tracks and the TDS compensation via head skew. Each servo frame comprises a sequence of pairs of leading and trailing servo stripes. Midpoints between the servo stripes in each pair, at all points having a same relative lateral height on the tape, are located along a virtual median line oriented at an angle $\beta$ from perpendicular to the longitudinal axis of the tape, the angle $\beta$ being greater than 1 degree.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
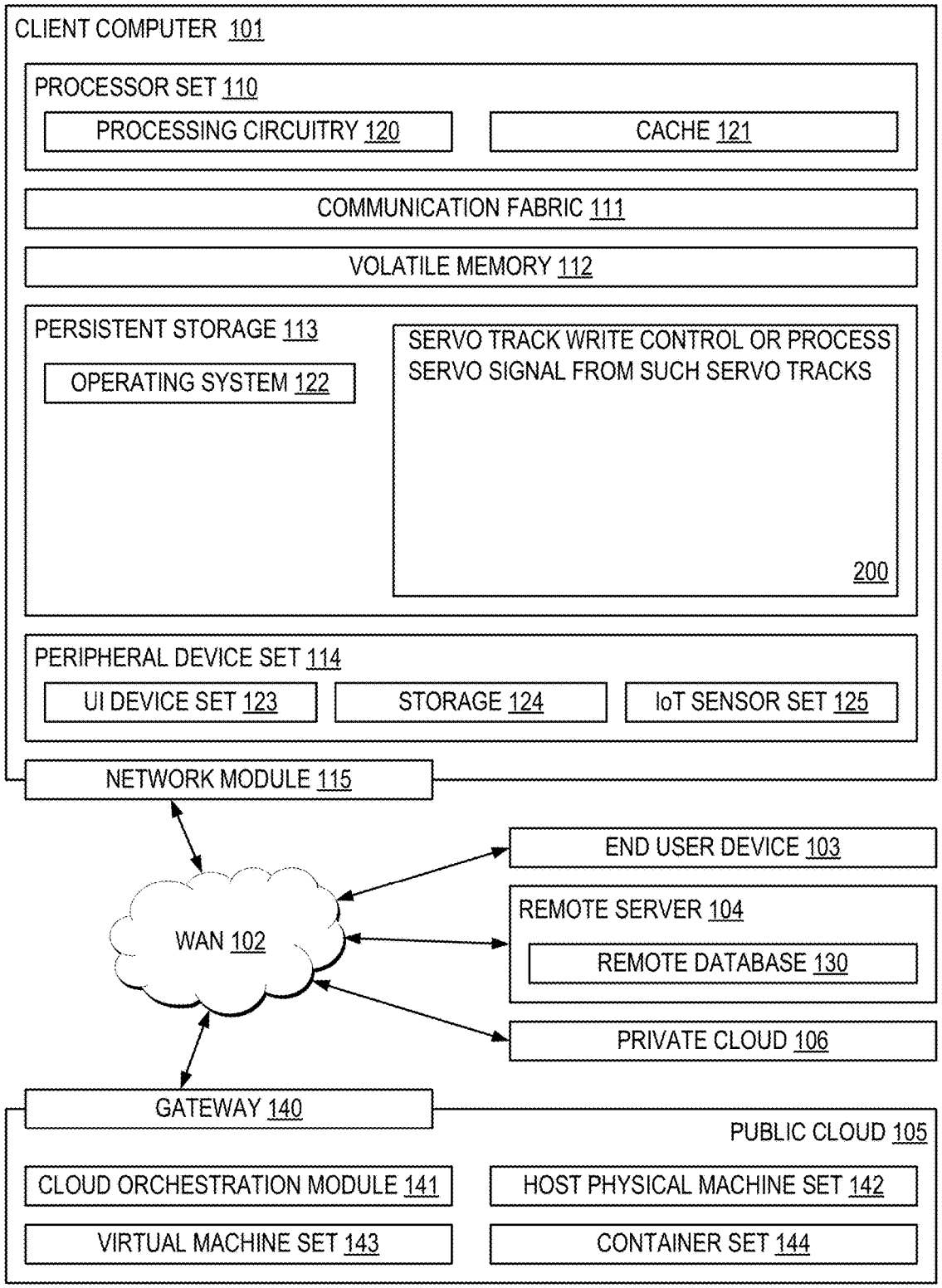
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic recording media and corresponding magnetic storage systems, as well as operation and/or component parts thereof.

In one general embodiment, a data storage product includes a magnetic recording tape having written thereon at least two servo tracks extending along a longitudinal axis of the tape. Each servo track has a timing-based servo (TBS) pattern comprising a series of servo frames arranged to enable lateral positioning of a magnetic head relative to the servo tracks as well as tape dimensional stability (TDS) compensation via head skew. Each frame comprises a sequence of pairs of leading and trailing servo stripes. Midpoints between the servo stripes in each pair, at all points having a same relative lateral height on the tape, are located along a virtual median line oriented at an angle β from perpendicular to the longitudinal axis of the tape, the angle β being greater than 1 degree.

In another general embodiment, an apparatus for writing servo tracks on a magnetic recording tape includes a servo write head having at least two write transducers positioned and configured to write parallel servo tracks along a longitudinal axis of the magnetic recording tape. Each resulting servo track has a timing-based servo (TBS) pattern comprising a series of servo frames arranged to enable lateral positioning of a magnetic head relative to the servo tracks as well as tape dimensional stability (TDS) compensation via head skew. Each frame comprises a sequence of pairs of leading and trailing servo stripes. Midpoints between the servo stripes in each pair, at all points having a same relative lateral height on the tape, are located along a virtual median line oriented at an angle β from perpendicular to the longitudinal axis of the tape, the angle β being greater than 1 degree.

In another general embodiment, an apparatus for performing data operations on a magnetic recording tape, in accordance with one embodiment, includes a magnetic head having at least two servo transducers positioned and configured to read parallel servo tracks extending along a longitudinal axis of the magnetic recording tape, the magnetic head also having an array of data transducers for performing data operations on the magnetic recording tape. A controller is in communication with the magnetic head, and is configured to perform lateral positioning of the magnetic head relative to the servo tracks as well as perform tape dimensional stability (TDS) compensation via head skew based on signals from the servo transducer reading timing-based servo (TBS) patterns of the servo tracks. Each servo track comprises a series of servo frames arranged to enable the lateral positioning of a magnetic head relative to the servo tracks and the TDS compensation via head skew. Each servo frame comprises a sequence of pairs of leading and trailing servo stripes. Midpoints between the servo stripes in each pair, at all points having a same relative lateral height on the tape, are located along a virtual median line oriented at an angle β from perpendicular to the longitudinal axis of the tape, the angle β being greater than 1 degree.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code in block 200 to control writing of servo tracks as described herein or to process servo signals derived from such tracks. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
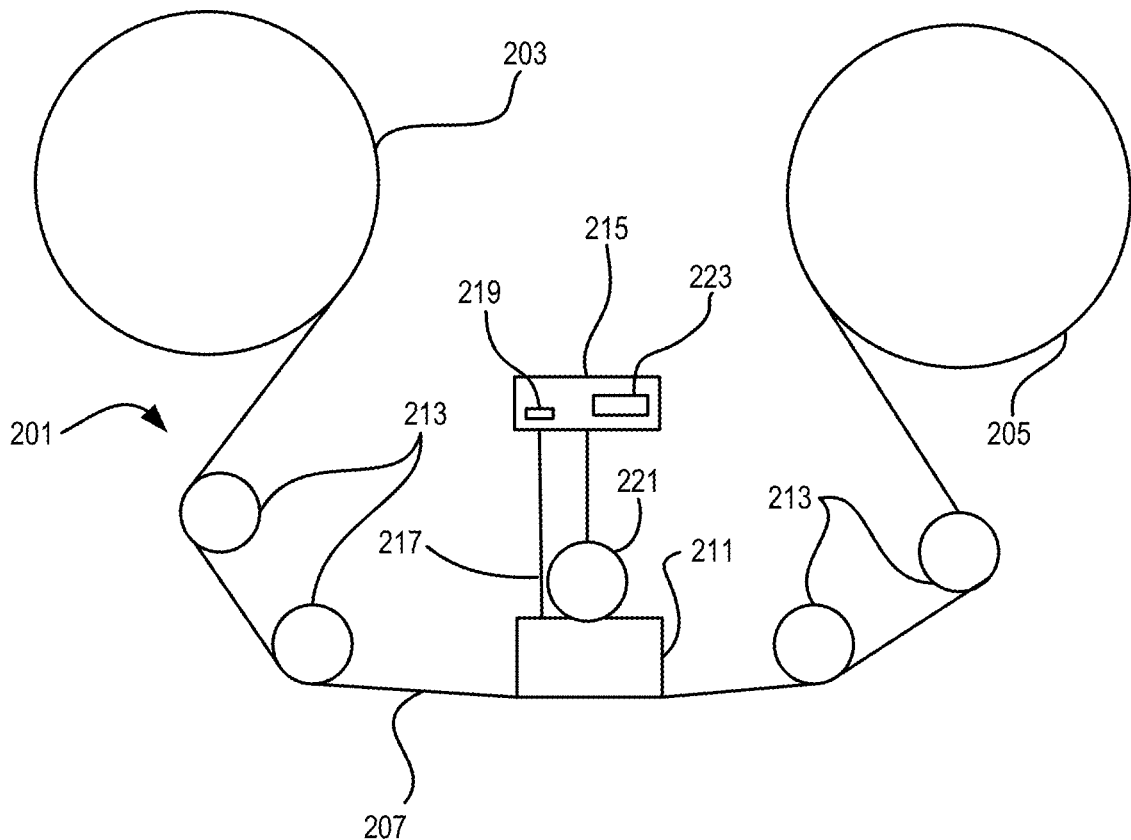
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
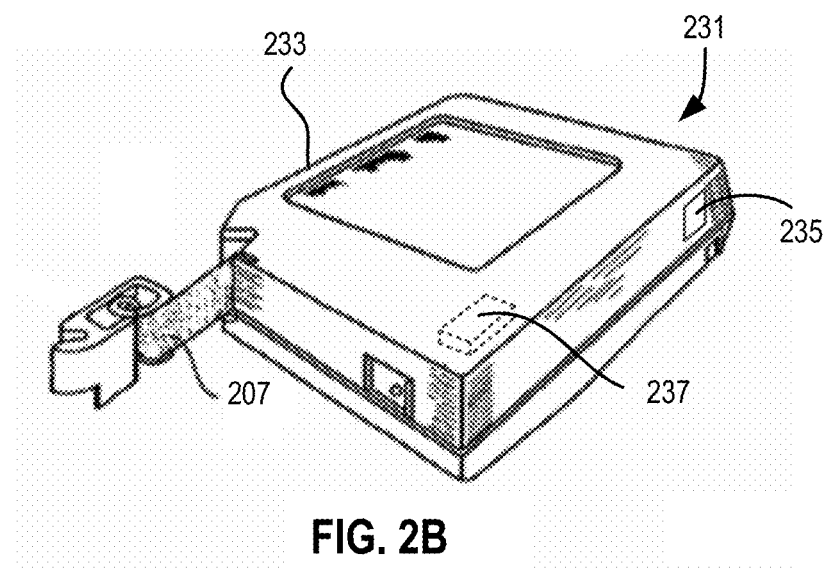
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
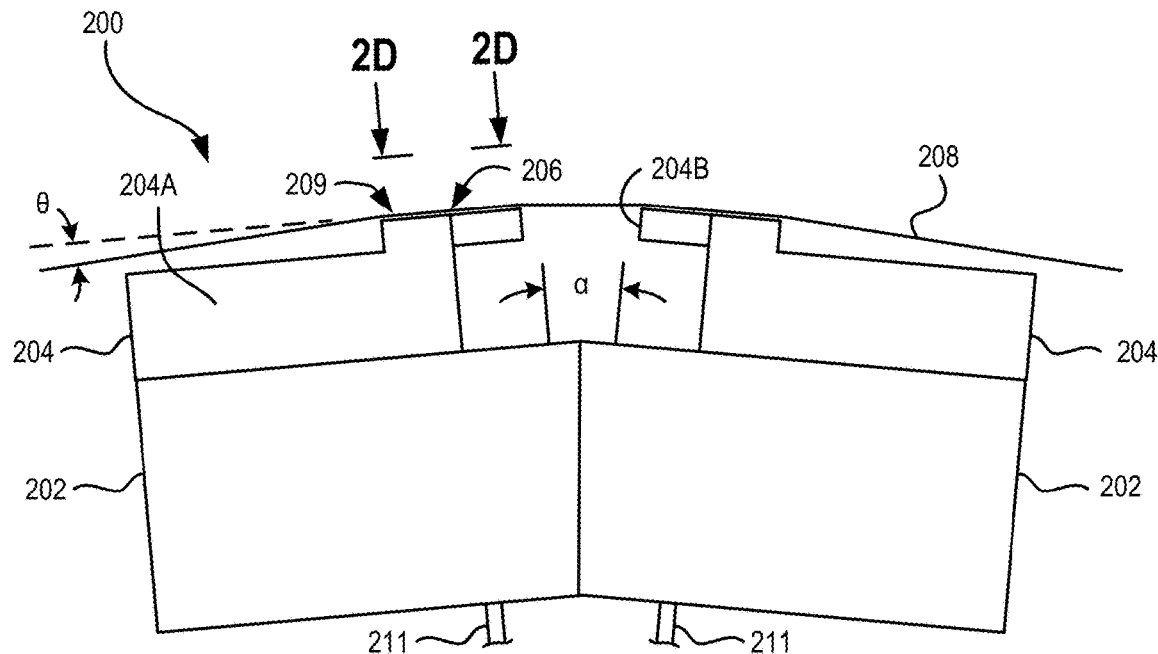
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
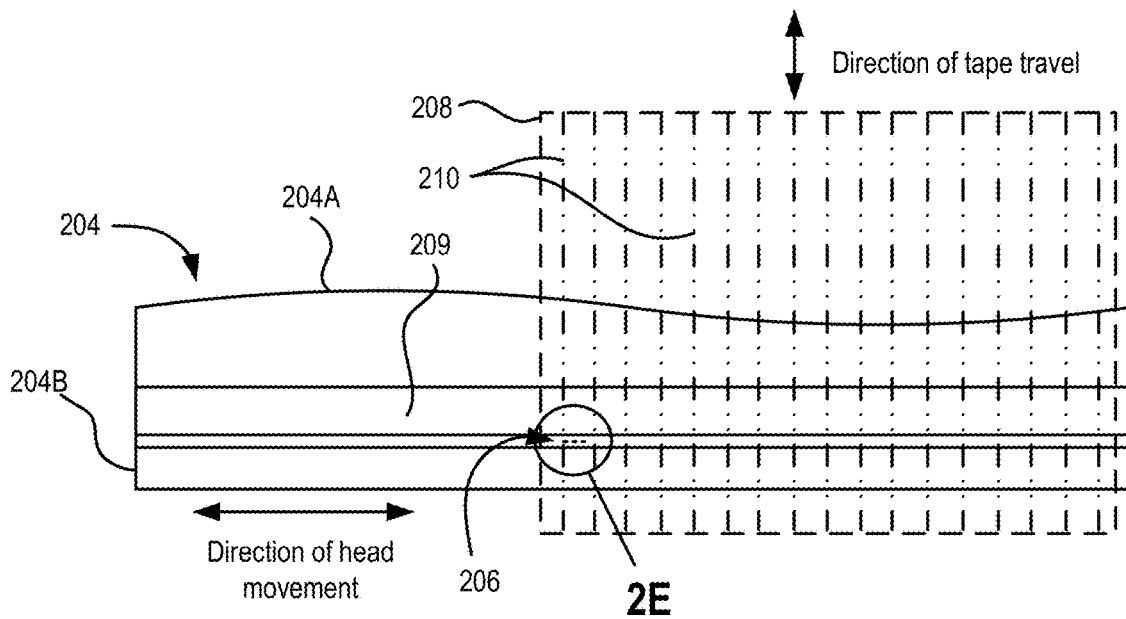
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
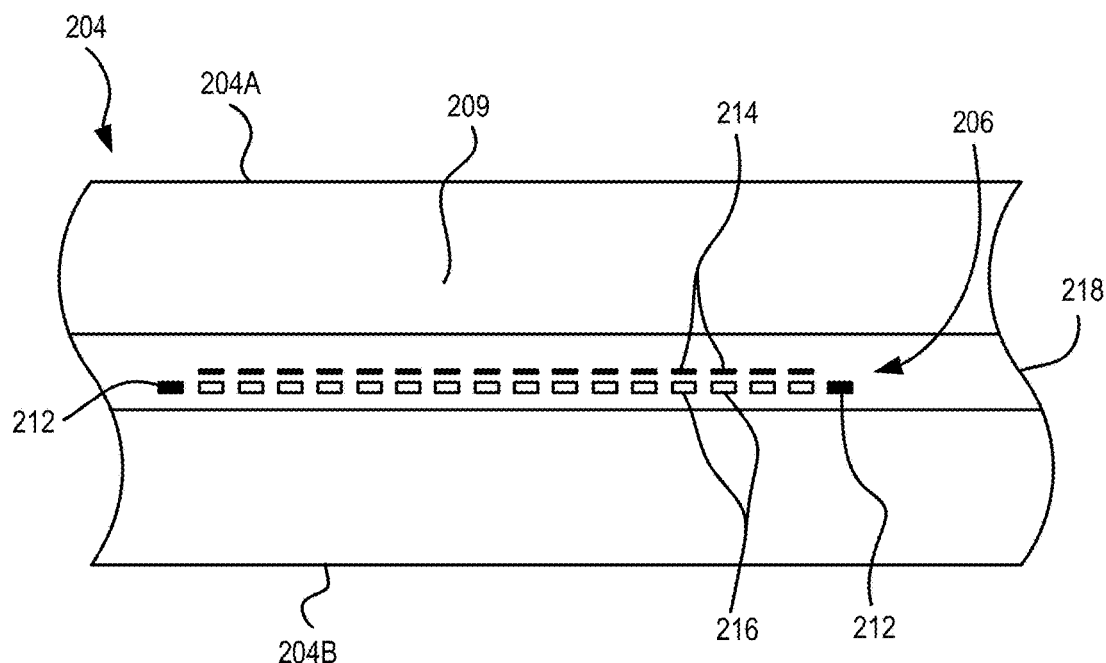
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
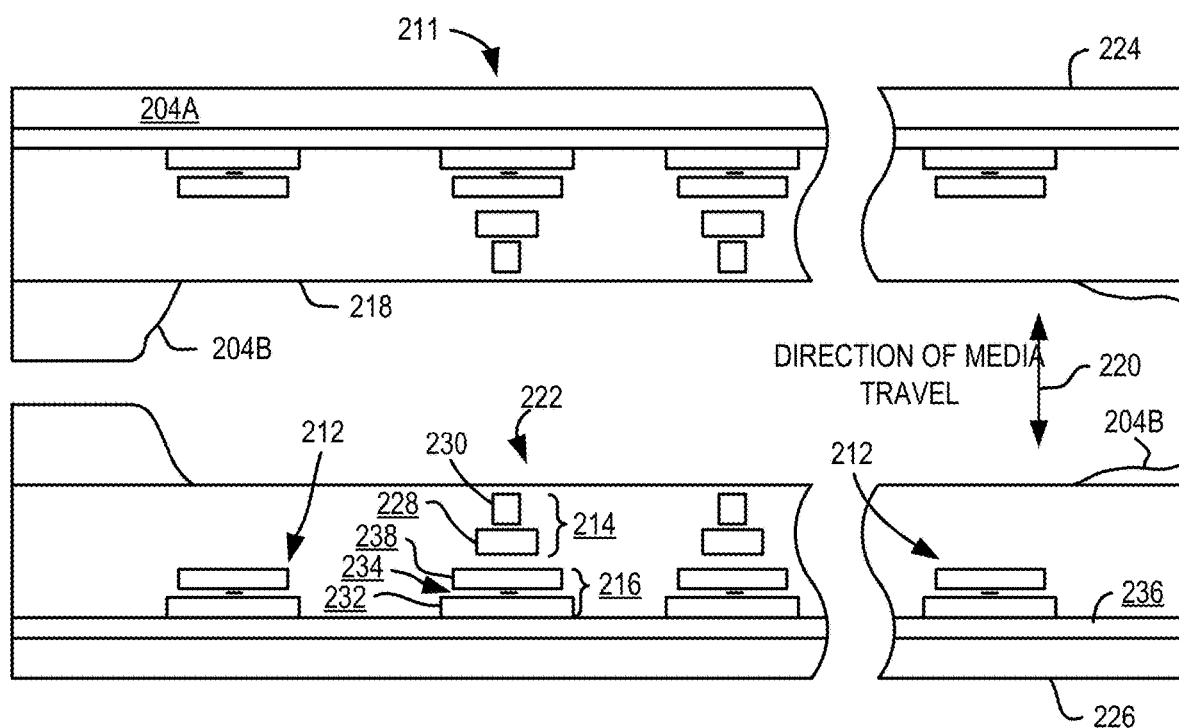
FIG. 2F is a detailed view of a partial tape bearing surface of a pair of modules.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
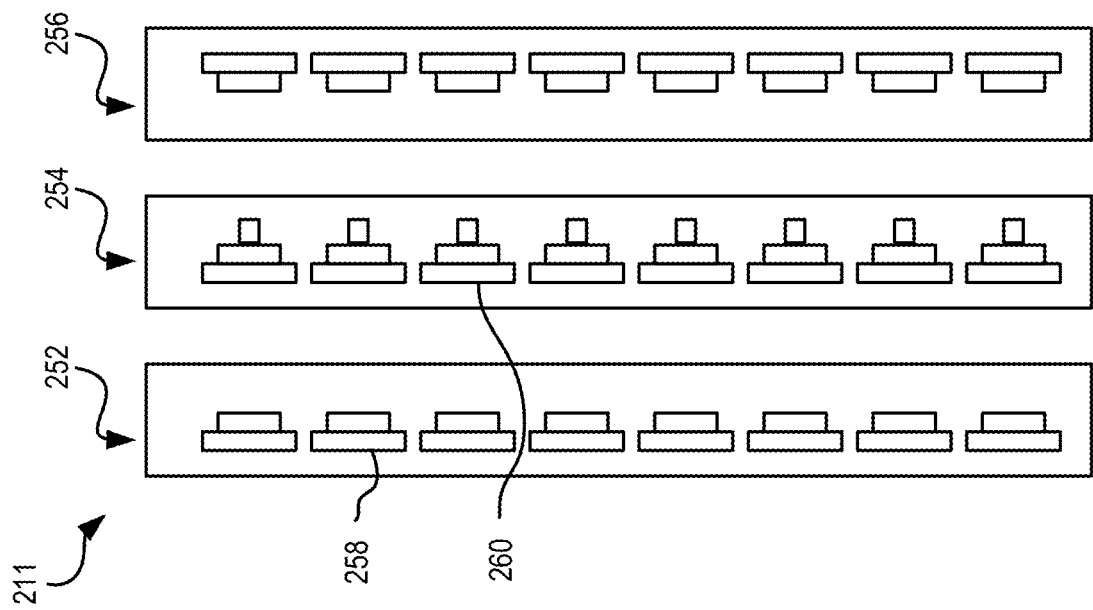
FIG. 4 is a partial tape bearing surface view of a magnetic head having a read-write-read configuration, in accordance with one embodiment.
Figure 3:
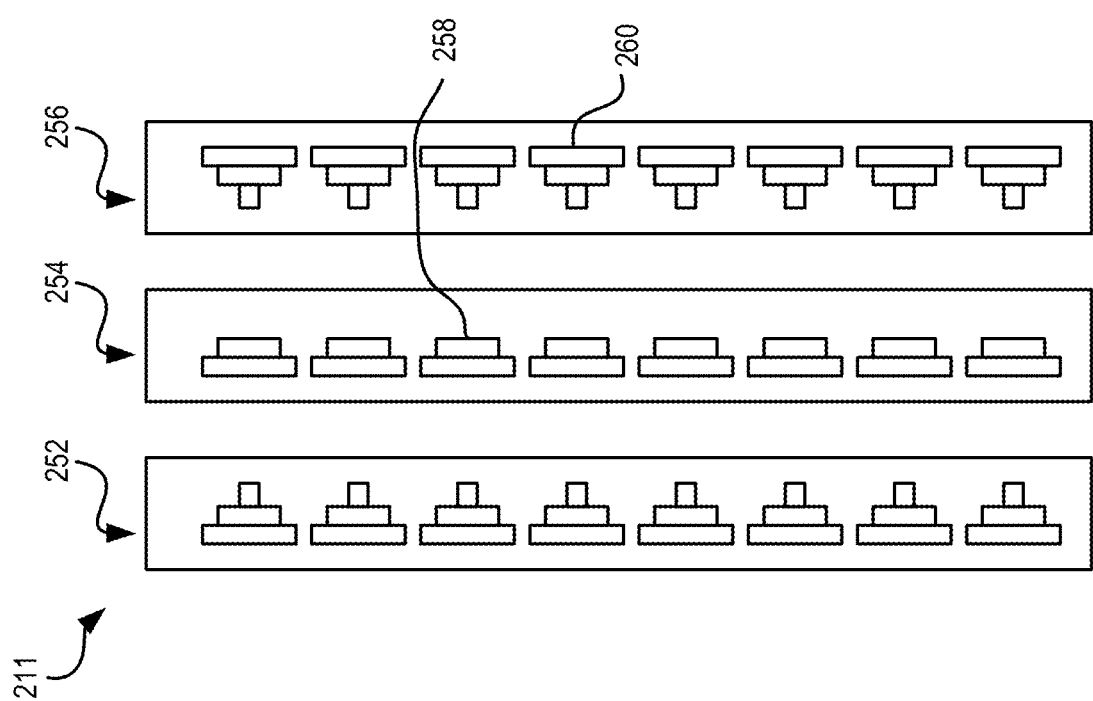
FIG. 3 is a partial tape bearing surface view of a magnetic head having a write-read-write configuration, in accordance with one embodiment.

The configuration of the tape head 211, according to one embodiment, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
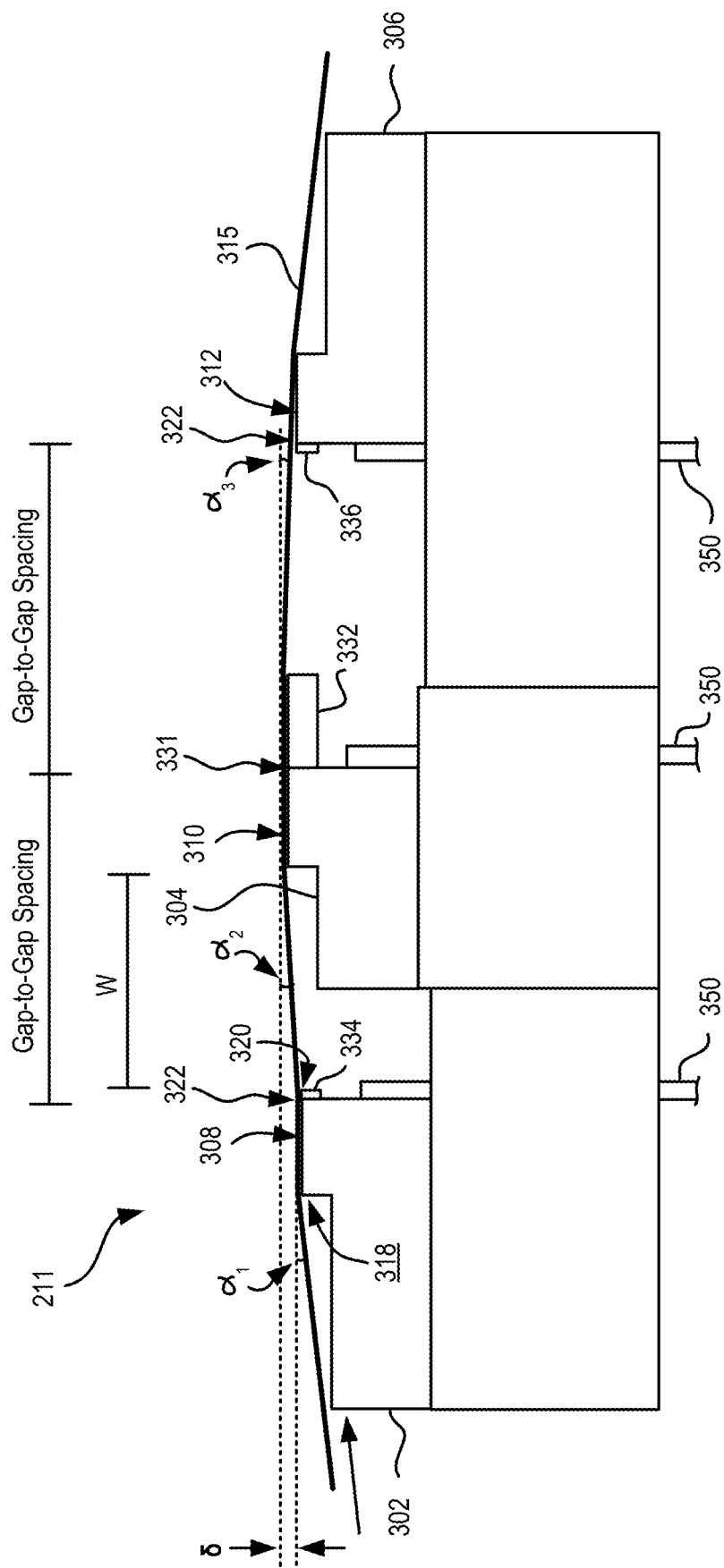
FIG. 5 is a side view of a magnetic tape head with three modules where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
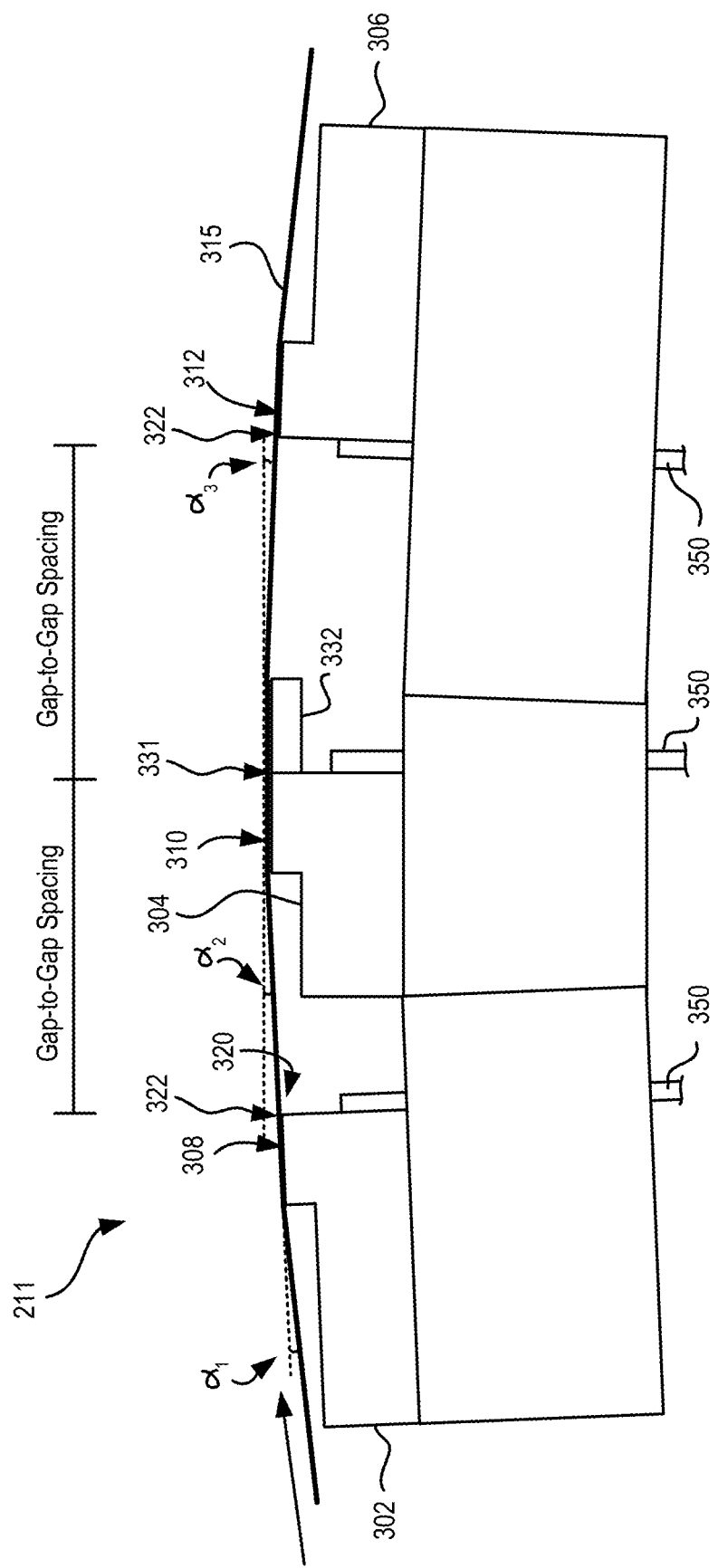
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
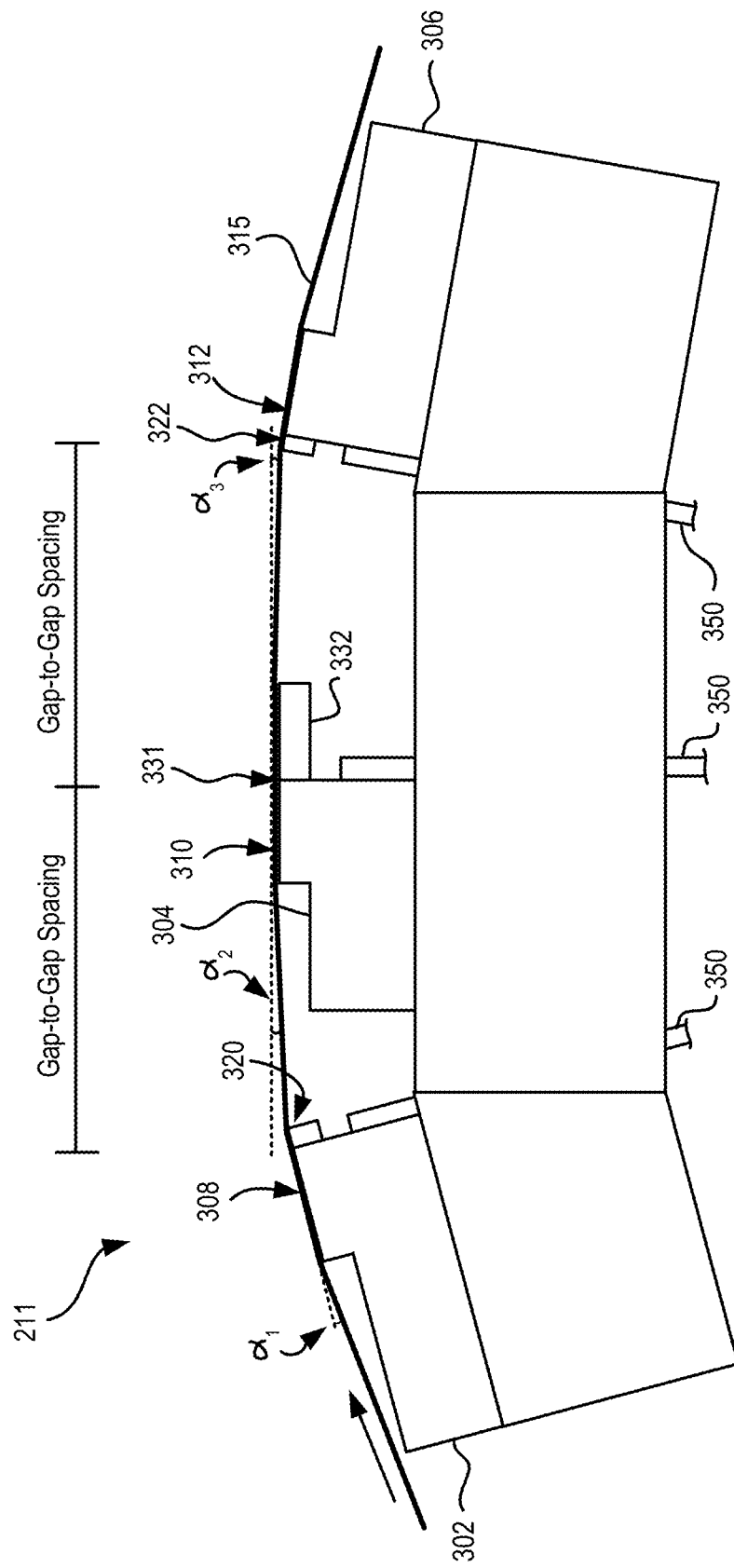
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
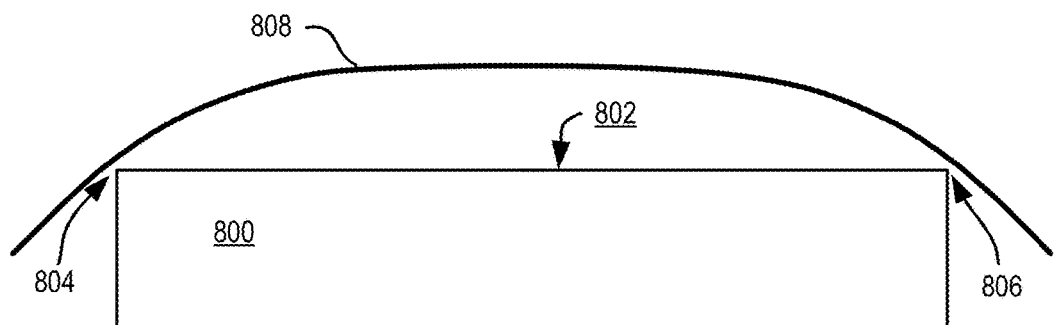
FIGS. 8A-8C are schematics depicting the principles of tape tenting.
Figure 8B:
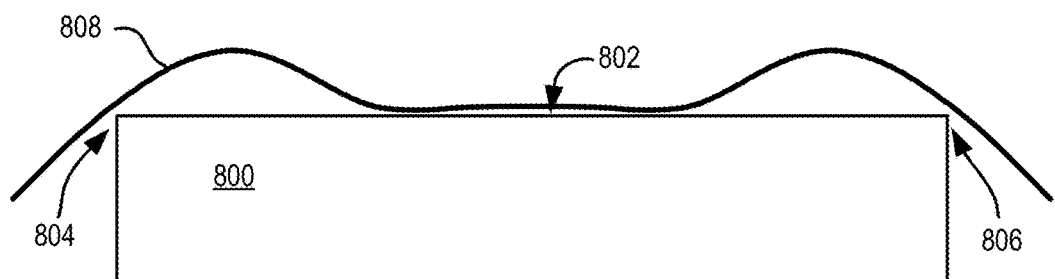
Figure 8C:
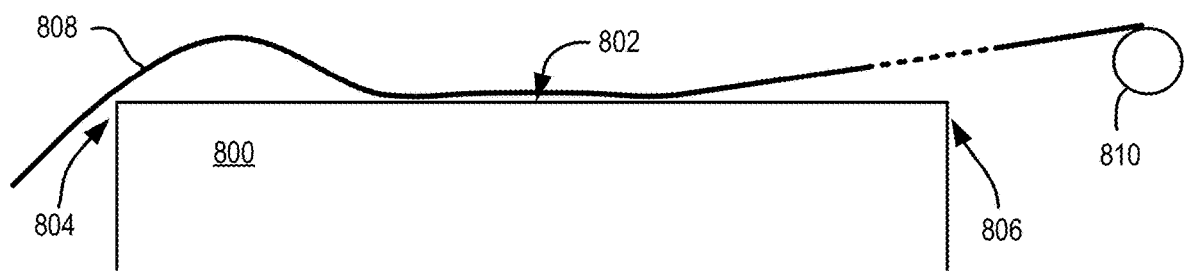

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
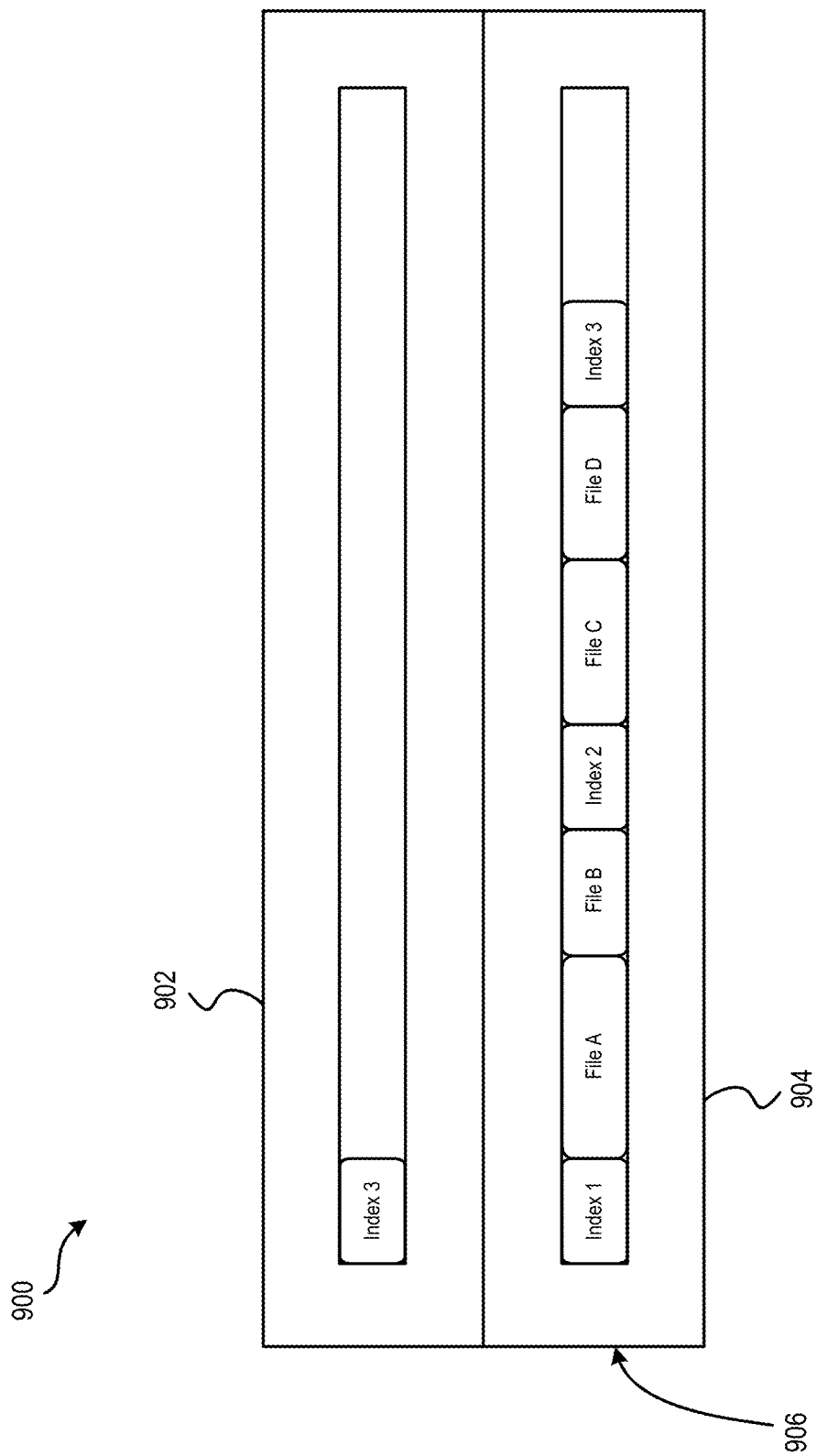
FIG. 9 is a representational diagram of files and indexes stored on a magnetic tape, in accordance with one embodiment.

Looking to FIG. 9, a magnetic tape 900 having an index partition 902 and a data partition 904 is illustrated, according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

During write operations on a magnetic recording tape, active skew control is used to enable read while write verification that helps to ensure reliability and active tape dimensional stability (TDS) control to enable higher track density, and hence, increased capacity. Both TDS and skew are measured using a pair of servo readers. The two servo readers are positioned at opposite ends of the array of read and write transducers and read two timing-based servo (TBS) patterns that bracket each data band during operation of the drive. The TBS servo pattern includes groups of stripes, called frames, written on the magnetic tape at an azimuth angle of +/−a as illustrated in FIG. 10, which depicts a conventional servo pattern, described now to provide a basic understanding of processing of TBS patterns.

Figure 10:
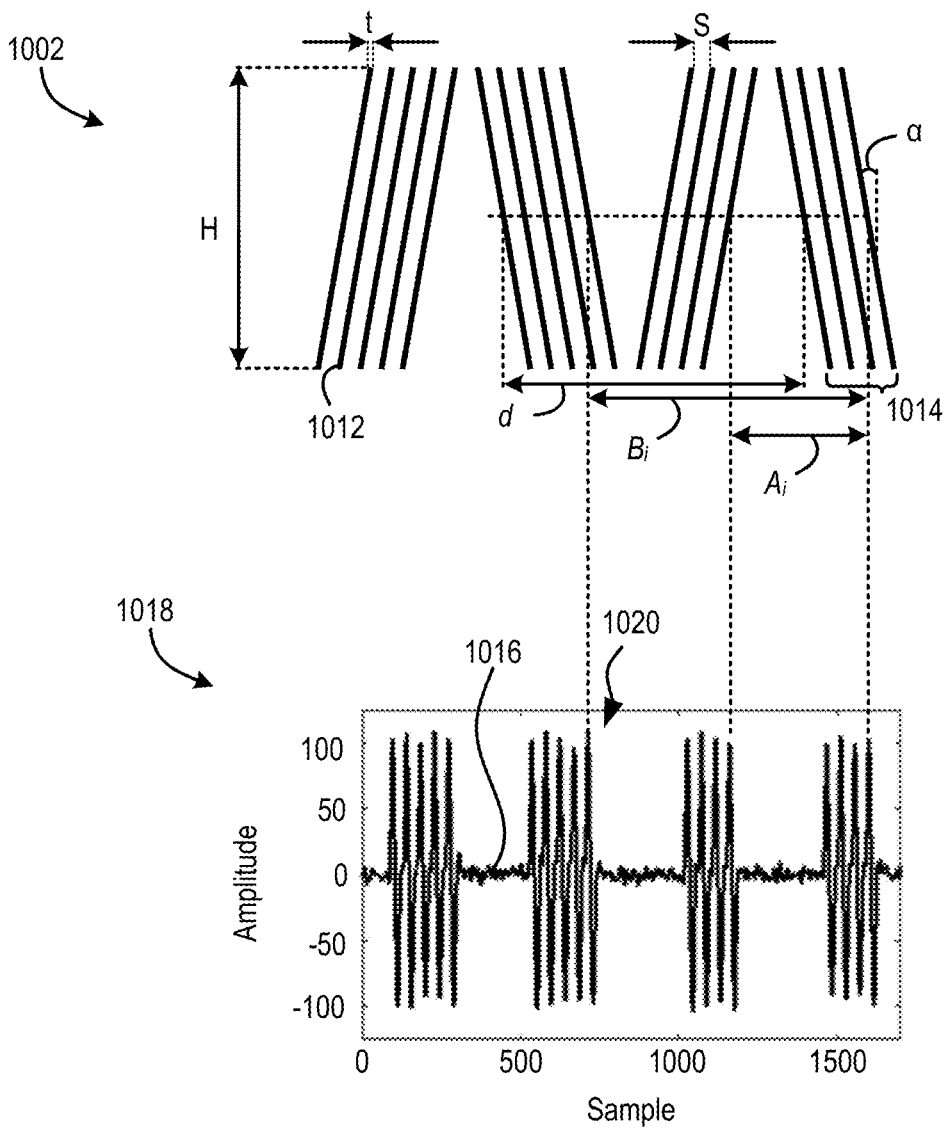
FIG. 10 depicts one frame of the conventional TBS pattern.

Particularly, FIG. 10 depicts one frame of the conventional TBS pattern 1002. As shown, a plurality of servo stripes 1012 together form a servo burst 1014, while corresponding pairs of servo bursts 1014 form servo sub-frames. Accordingly, the depicted TBS frame has four servo bursts 1014 and two servo sub-frames. In the present embodiment, the servo stripes 1012 in the frame are arranged in a 5-5-4-4 pattern, in which the servo bursts 1014 included in the left servo sub-frame each have five servo stripes 1012, while the servo bursts 1014 included in the right servo sub-frame each have four servo stripes 1012. The servo stripes 1012 included in a given servo burst 1014 are oriented such that they have a same azimuthal slope represented by angle $\alpha$. In some conventional approaches, $\alpha$=12 degrees.

Moreover, corresponding pairs of servo bursts 1014 have opposing azimuthal slopes, thereby forming a chevron-type pattern. The height H and thickness t of the servo stripes 1012 may vary depending on the servo writer used to write the TBS pattern 1002. In conventional products, the height H is about 93 μm, and the angle $\alpha$ may be about 12°, while the thickness t is about 1.25 μm. Moreover, the spacing S between each of the servo stripes 1012 and/or the distance d between servo bursts 1014 having the same azimuthal slope are typically specified according to the servo format specifications, e.g., as specified in LTO. For example, the spacing S may be about 3 μm, while the distance d is about 76 μm. As described above, patterned transitions such as that shown in FIG. 10 allow for an estimate of the head lateral position to be determined by evaluating the relative timing of pulses generated by a servo reader reading the servo stripes 1012 of the servo burst 1014 as they are passed over the servo reader.

As the servo reader reads the servo pattern during tape transport, it produces a series of 'dibit' pulses in response to each stripe, resulting in bursts of dibit pulses in a repeating pattern, such as a 5-5-4-4 pattern. Also shown in FIG. 10 is a graph 1018 plotting amplitude vs. sample index of the TBS pattern 1002 of FIG. 10, detected as a servo readback signal 1016 during readback. A servo channel may decode the readback signal that is received from a servo reader of a magnetic tape head reading the TBS pattern 1002. For example, when a servo stripe 1012 of the TBS pattern 1002 passes across the servo sensor, a dibit, or double pulse portion 1020 (having a positive peak and a negative peak) of the readback signal 1016 is generated, e.g., for purposes of an example see lateral dashed lines indicating how double pulse portions of the readback signal 1016 correspond to servo stripe read locations. The relative timing of these di-bit pulses are analyzed by a servo channel to produce a series of measurements of the lateral position of the tape relative to the head referred to as YPOS. Accordingly, two or more of such double pulse portions and timing associated therewith may be used in calculating lateral position (YPOS) estimates.

For such a servo pattern, the servo channel may provide y-position estimates to a track-following control system, e.g., where such y-position estimates are calculated using Equation 1 below.

$$\hat{y} = \frac{d}{2\tan(\alpha)} \left( \frac{1}{2} - \frac{\sum A_i}{\sum B_i} \right) \quad \text{Equation 1}$$

As shown above, the lateral y-position estimate $\hat{y}$ of Equation 1 may incorporate: the distance d, the azimuthal slope (angle $\alpha$) of the servo stripes 1012, a measured time $B_i$ between pairs of corresponding servo stripes with the same azimuth angle (e.g., parallel stripes //, or \\) from two different sub-frames, and a measured time $A_i$ between pairs of corresponding servo stripes with opposite azimuth angle (e.g., stripes /\) from the same sub-frame.

For example, in the 5-5-4-4 pattern of FIG. 10, four measurements $A_i$, i=0, 1, 2, 3 and four measurements of $B_i$, i=0, 1, 2, 3 are performed per servo sub-frame of the TBS pattern 1002 of FIG. 10. In some approaches, the distance d is may be referred to as the "sub-frame length."

The skew of the tape relative to the head may also be measured by comparing the distance travelled between the arrival of a di-bit pulse observed with the top servo reader from a given stripe in the servo pattern and the pulse from the corresponding stripe observed with the bottom servo reader. This technique is known as top-bottom skew.

Changes in tape dimensional stability (TDS) are measured by calculating the difference between the YPOS value measured using readback signals from the top servo reader and that measured using readback signals from the bottom servo reader. This difference is referred to as servo band difference (SBD). An increase in SBD typically corresponds to a decrease in the width of the tape. Changes in the width of the tape that result from changes in temperature, humidity and tension as well as to long term creep effects are referred to as changes in TDS. Changes in TDS, especially tape width, are measured by changes in SBD and should be actively compensated for.

In current tape drives, tape tension is used for active TDS compensation, e.g., by using tension to control the width of the tape as it passes over a magnetic head. However, this approach is limited in range, and moreover, introduces additional problems such as longer cycle times due to low tension unload, tape cinch, increased risk of tape breakage, variable tape head friction, variable tape head spacing, etc. As such, there is a need for a new TDS compensation scheme.

The most promising approach is tilt-based TDS compensation. In this method, the tape drive is operated with a head that has a nominal rotation angle ($\beta$) relative to the tape, where $\beta$ is on the order 1-10 degrees. The effective span of the head as presented to the tape can then be increased or decreased by decreasing or increasing the rotation angle. Larger angles provide more TDS compensation gain. However, larger angles may introduce problems in the performance of the servo channel.

In current tape drives (that do not implement skew-based TDS compensation) the absolute value of the angle of the servo stripes relative to the servo reader is constant. As a result, the dibits produced by the servo reader reading stripes with a positive angle are the same as that from stripes with a negative angle. If, however, the head is rotated by an angle $\beta$ (e.g., clockwise) relative to the tape, the relative angle of the servo reader to the first set of stripes in FIG. 10 will be ($\alpha-\beta$), and for the second set of stripes it will be ($\alpha+\beta$). For example, for $\alpha$=12 degrees and $\beta$=10 degrees, the relative angles are 2 and 22 degrees. This difference in relative angle results in a strong asymmetry between the first and second dibit burst, in which the first set of dibits read with 2 degrees will be very sharp and short in time, while the second set read at 22 degrees will have a much lower amplitude and will be smeared out in time. This asymmetry results in a significant degradation of the performance of the servo channel, i.e., increased estimation noise, which will degrade the track following performance. In cases of very large asymmetry, the servo channel may not be able to produce a position estimate. A second problem is that estimates produced by the upper and lower servo readers are no longer aligned in time, resulting in increased delay when they are averaged, and hence degraded track following performance. The same effect gives rise to problems with LPOS combining of the upper and lower servo readers/channels. Finally, skew detection is complicated by the misalignment of the arrival time of bursts in the upper and lower servo readers.

There is an additional distortion (asymmetry) of the servo readback waveform that results due to an asymmetry in the stripe pitch and stripe width as observed by the head after pattern rotation. This effect is illustrated in FIG. 11 for a case with exaggerated rotation angle ($\beta$=30 degrees) to make the effect easier to visualize.

Figure 11:
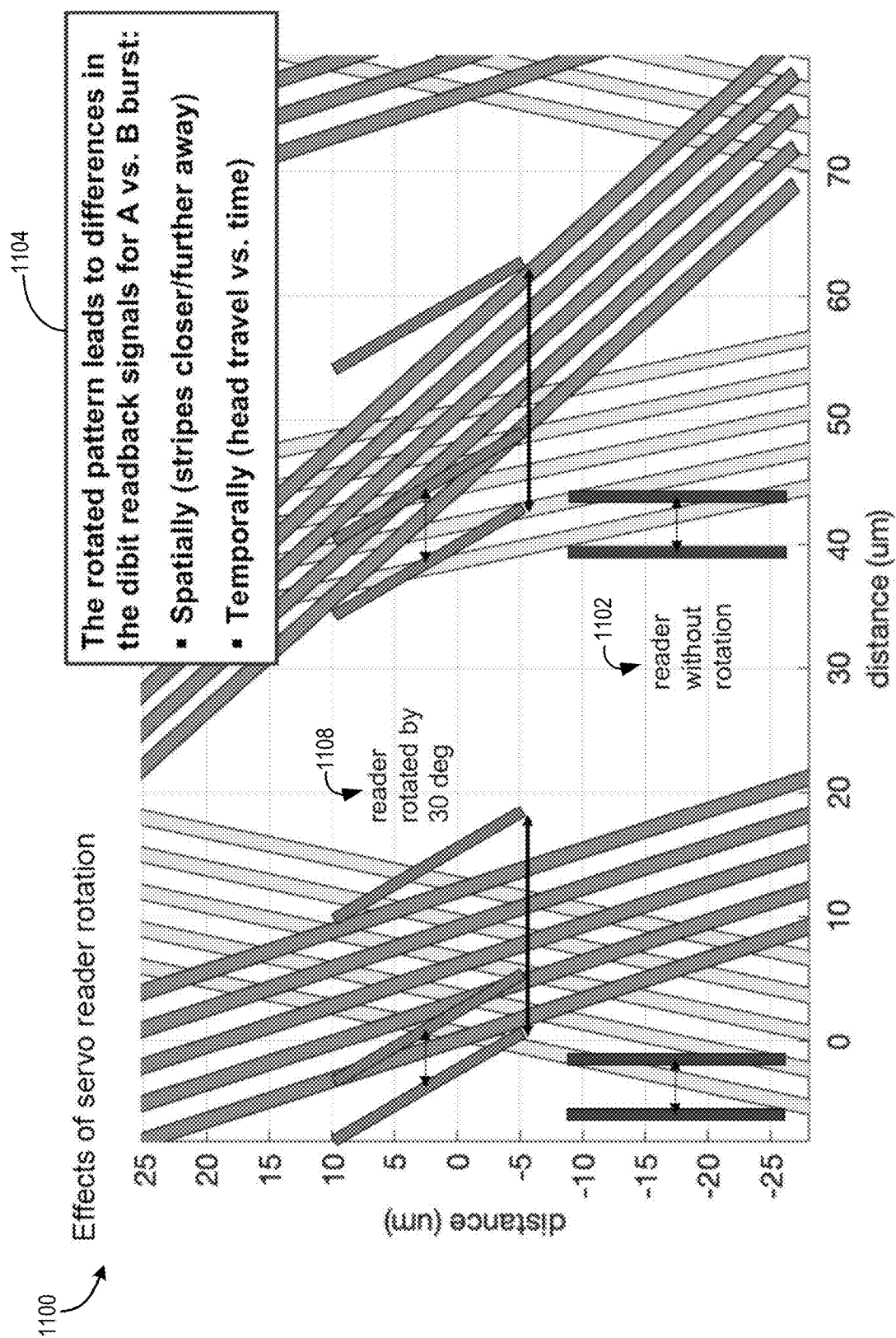
FIG. 11 is a graphical depiction of the effects of servo reader rotation relative to a servo track.

FIG. 11 illustrates a block diagram 1100 that shows exemplary TBS servo patterns as in FIG. 10, where the servo reader is positioned relative thereto at $\beta$=0 degree and $\beta$=30 degrees of rotation. Particularly, shown are readers without rotation ($\beta$=0) (e.g., reader shown via reference numeral 1102) and readers with rotation of $\beta$=30 degrees (e.g., reader shown via reference numeral 1108). The relative angle between the servo reader and the stripes leads to differences in dibit readback signals for A burst vs. B burst (as shown via reference numeral 1104) caused by spatial changes where stripes appear to the reader to be closer or further away, and by temporal changes in head travel vs. time.

In U.S. Patent Application Pub. No. 2022/0108718 A1 to Bui et al. (hereafter, "the '718 pub."), which is herein incorporated by reference to the extent the disclosure thereof does not contradict the teachings herein, a method was presented to create a servo pattern for skew-based TDS compensation which is based on rotating a "classical" TBS pattern and adjusting the heights of top and bottom portions of servo stripes of servo frames of the TBS patterns to compensate for changes in usable height of the servo stripes caused by the rotation. However, the approach disclosed in the '718 pub. has several drawbacks.

First, despite the height adjustments of the servo stripes, the usable height is lower than in the unrotated pattern, and therefore leads to a loss in available y-position (YPOS) range. The latter reduces the track placement options and the TDS compensation range, and hence lowers the achievable tape cartridge capacity.

Second, the YPOS estimates derived from the time/duration measurements between pairs of servo bursts (also known as "A" and "B" counts) by a servo channel designed for a conventional (non-rotated) servo pattern need to be adjusted/corrected to provide an accurate measurement of the actual YPOS in the perpendicular to the tape travel direction.

Third, the servo "centerline," defined as the line where the ratio of "A"/"B" counts is 0.5, is no longer centered between the top and bottom edge of the pattern and hence may lead to an asymmetric range.

Fourth, the servo band-to-band alignment is matching the angle bisector (half-angle line, β=10 deg rotated), which complicates the top-to-bottom skew estimation in TDS environments.

The following embodiments overcome the foregoing drawbacks and problems found in the approach presented in the '718 pub. Particularly, described herein is a new and novel method and design of a servo pattern for skew-based TDS compensation which does not suffer from the drawbacks of a "rotated servo pattern" (e.g., by rotating the servo head during servo formatting, or rotating the position of the write gaps on the servo format head) by an angle equal to the nominal angle of rotation, β, of the tape drive head.

Just some advantages of the new servo pattern and servo formatting head geometry presented herein, provided by various embodiments of the present invention, are:

1) Achieves identical pattern subframe length and pattern height compared to a TBS pattern without rotation (β=0), and therefore no loss in update rate and y-position range.
2) Computation of the y-position estimate based on the time/duration measurements between pairs of servo bursts (also known as the "A" and "B" counts) is identical compared to the nonrotated patterns, and therefore does not need scaling due to β≠0.
3) Symmetrical y-position range versus servo centerline.
4) Simple top-bottom skew estimation, even under TDS environment, due to the servo band-to-band alignment based on the median of the write gaps.

Figure 12:
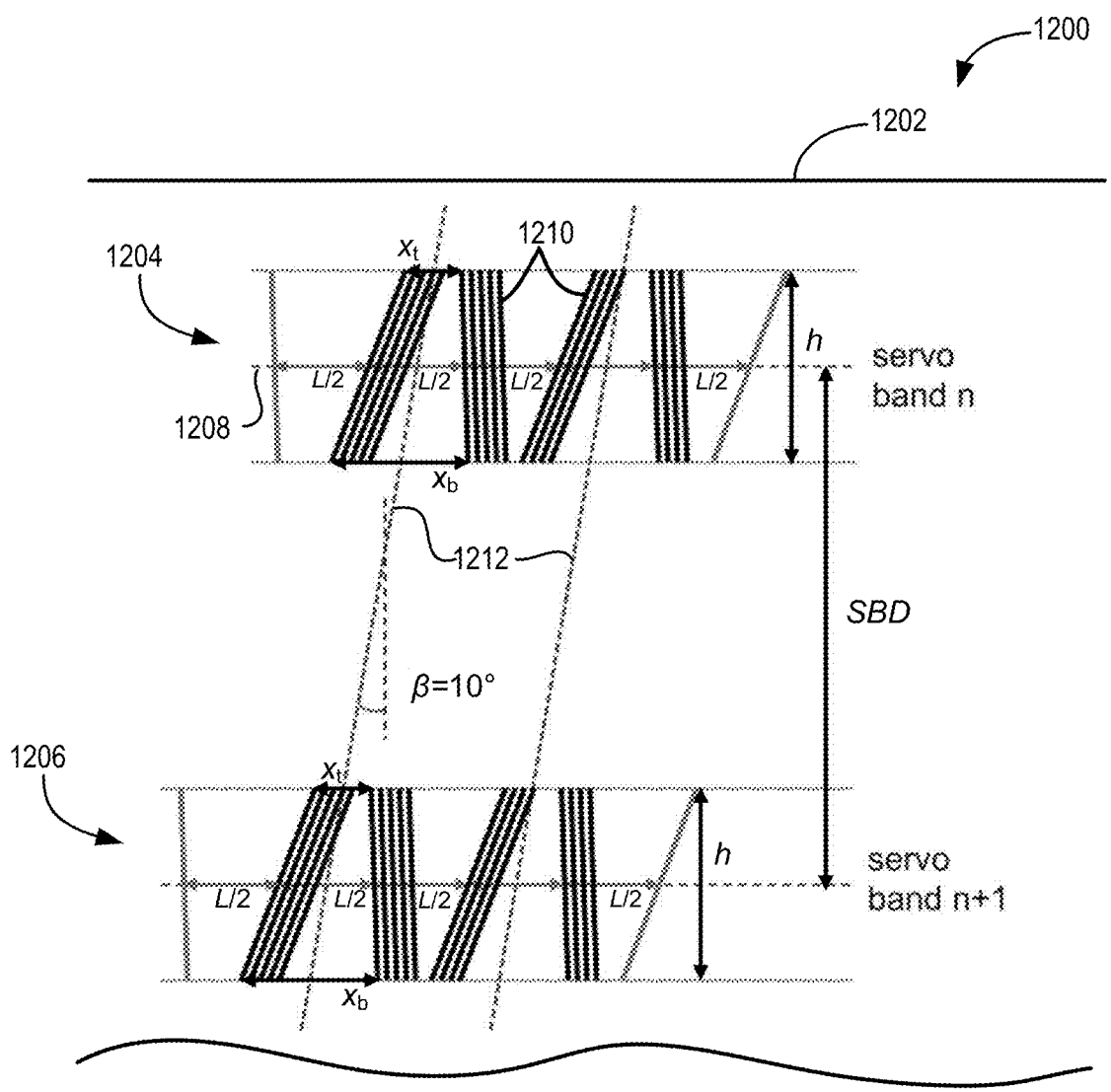
FIG. 12 depicts a representation of a portion of a data storage product, in accordance with one embodiment.

FIG. 12 depicts a representation of a portion of a data storage product 1200, in accordance with one embodiment. As an option, the present product 1200 may be implemented in conjunction with features from any other embodiment listed herein, such as those described with reference to the other FIGURES, so long as the implementation does not stray from the novel descriptions herein. Of course, however, such product 1200 and others presented herein may be used in various applications and/or in permutations which may or may not be specifically described in the illustrative embodiments listed herein. Further, the product 1200 presented herein may be used in any desired environment.

In one approach, the product 1200 may be a cartridge, such as that shown in FIG. 2B, having components such as a cartridge housing, and a spool in the housing, with a magnetic recording tape 1202 wound around the spool. In another approach, the product 1200 is simply a magnetic recording tape 1202 configured as described herein. The magnetic recording tape 1202 may have any type of physical construction, including conventional-type constructions having a recording layer.

The magnetic recording tape 1202 has written thereon at least two servo tracks 1204, 1206 extending along a longitudinal axis 1208 of the tape. Preferably, at least five servo tracks are present on the tape. The longitudinal axis 1208 corresponds to the intended direction of tape travel across a magnetic head when the tape is in use.

Each servo track 1204, 1206 has a TBS pattern comprising a series of servo frames arranged to enable lateral positioning (y-position, or YPOS) of a magnetic head relative to the servo tracks 1204, 1206 as well as TDS compensation via head skew. In FIG. 12, one servo frame is shown in each servo track 1204, 1206.

Each frame comprises a sequence of pairs of leading and trailing servo stripes 1210 in a chevron-like pattern. While the servo frames in various aspects may have any desired number of servo stripes, the example shown has a 5-5-4-4 pattern.

As described more clearly in an exemplary embodiment and related figure described below, midpoints between the servo stripes in each pair, at all points along the servo stripes in the pair having a same relative lateral height on the tape (where the lateral heights are measured perpendicular to the longitudinal axis of the tape), are located along a virtual (imaginary) median line 1212 oriented at an angle β from perpendicular to the longitudinal axis 1208 of the tape. The angle β is greater than 1 degree. For example, the topmost points of the servo stripes in the pair are both equidistant from the median line; likewise, the bottommost points of the servo stripes in the pair are both equidistant from the median line.

As shown in FIG. 12, the frames in adjacent ones of the servo tracks 1204, 1206 are aligned along the virtual median line 1212 for enabling TDS compensation. Note that the servo band-to-band alignment is aligned according to the median line 1212 (10 deg rotated in this example) and not the angle bisector (half-angle line) as in prior attempts at rotated design. The approach presented herein simplifies top-bottom skew estimation, thereby making skew estimation more efficient, improving operation of the servo processing portion of the tape drive. Moreover, the frames, and stripes therein, in adjacent ones of the servo tracks 1204, 1206 are positioned such that calculation of the lateral position of the head relative to the servo tracks servo tracks 1204, 1206 does not depend on β, as it did in prior attempts at rotated design such as the '718 pub. In addition, the servo stripes 1210 are positioned such that the angle β is not needed in the calculation to compute the lateral position (y-position) of the magnetic head relative to the servo tracks.

Figure 13:
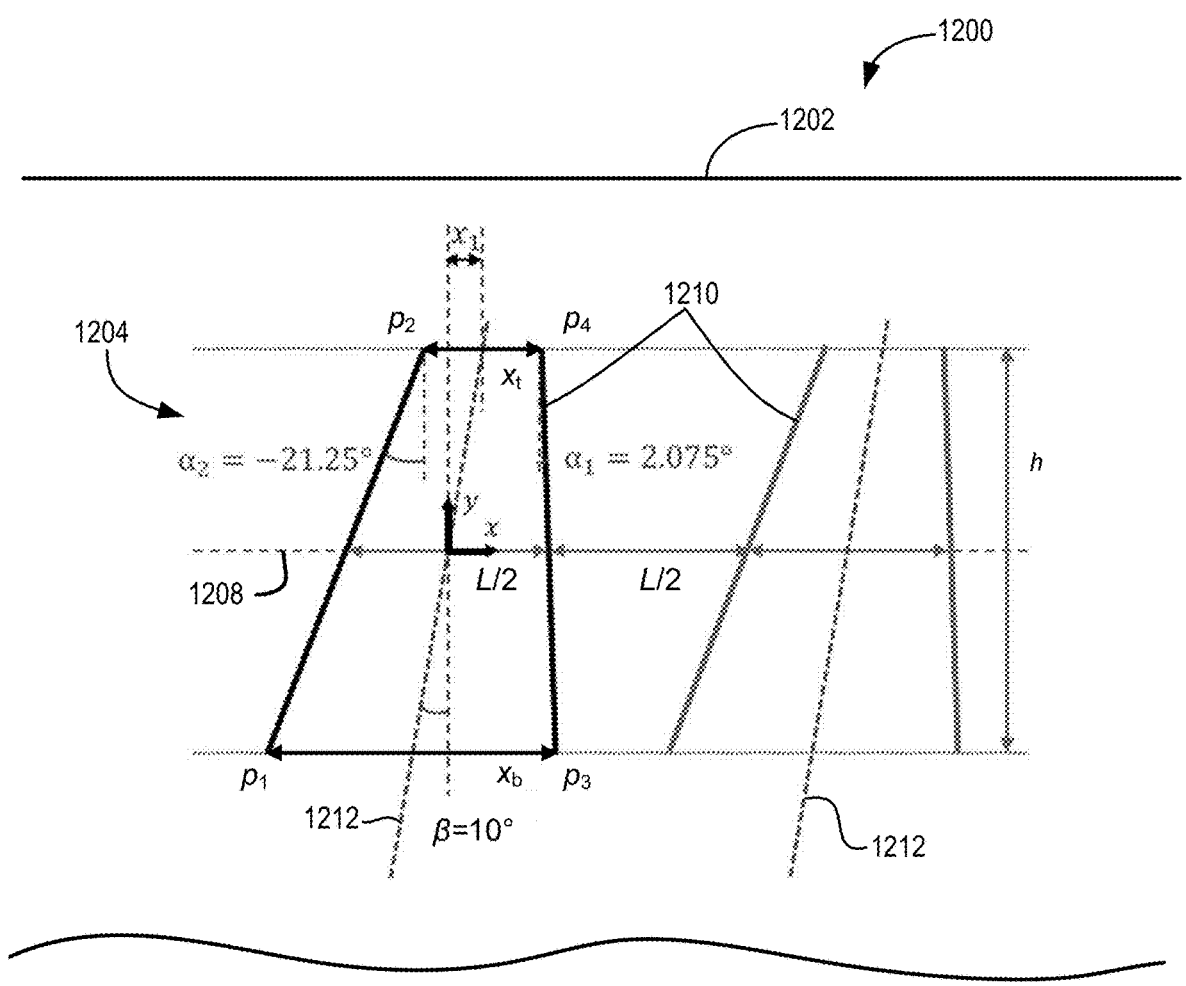
FIG. 13 is a graphical illustration of two pairs of servo stripes from a single frame, and exemplary dimensions, rotation angles, and the like, in accordance with an exemplary embodiment.

FIG. 13 illustrates two pairs of servo stripes 1210 from a single frame, and exemplary dimensions, rotation angles, and the like, in accordance with an exemplary embodiment. Advantageously, all servo stripes in the servo tracks have a same pattern height h as measured perpendicular to the longitudinal axis 1208 of the tape. This minimizes the height of the of the pattern compared to prior attempts at rotated design.

As will become apparent to one skilled in the art after reading the present disclosure, some of the dimensions and angles are selectable, such as angle β, distances $x_t$ and $x_b$, and others so long as the selected values do not stray from the parameters set forth herein, while other dimensions and angles may be dependent upon the selectable parameters. Illustrative dimensions and angles and formulae for calculating such dimensions and angles are provided hereinbelow. This has been done by way of example only, and should not be deemed limiting.

The distance $x_t$ between topmost endpoints of each pair of servo stripes may be calculated according to the following formula:

$$x_t = \frac{L}{2} - h\tan(\alpha) \qquad \text{Equation 2}$$

where L is a subframe length,
h is a pattern height of the associated servo track, and
α is an equivalent azimuth angle of a nonrotated pair of servo stripes having topmost points aligned along the longitudinal axis of the tape, and bottommost points aligned along the longitudinal axis of the tape.

Similarly, the distance $x_b$ between bottommost endpoints of each pair of servo stripes may be calculated according to the following formula:

$$x_b = \frac{L}{2} + h\tan(\alpha) \qquad \text{Equation 3}$$

A sum of a first angle $\alpha_1$, measured between a first of the servo stripes 1210 in each pair and line 1208 and a second angle $\alpha_2$, measured between a second of the servo stripes in the pair and the line 1208 is not equal to $2*\alpha$.

The distance $x_1$ between "median" and original vertical line at the top/bottom are calculated according to the following formula:

$$x_1 = \frac{h}{2}\tan(\beta) \qquad \text{Equation 4}$$

The endpoints $p_1(x,y)$, $p_2(x,y)$, $p_3(x,y)$, $p_4(x,y)$ of the stripes 1210 are calculated according to the following formulae:

$$p_1(x, y) = \left(-x_1 - \frac{x_b}{2}, -\frac{h}{2}\right) \qquad \text{Equation 5}$$

$$p_2(x, y) = \left(+x_1 - \frac{x_t}{2}, +\frac{h}{2}\right) \qquad \text{Equation 6}$$

$$p_3(x, y) = \left(-x_1 + \frac{x_b}{2}, -\frac{h}{2}\right) \qquad \text{Equation 7}$$

$$p_4(x, y) = \left(+x_1 + \frac{x_b}{2}, +\frac{h}{2}\right) \qquad \text{Equation 8}$$

Angles $\alpha_1$, $\alpha_2$ may be derived from the foregoing endpoints $p_i(x,y)$ calculated according to the following formulae:

$$\alpha_2 = a\tan(-\tan(\beta) - \tan(\alpha)) \qquad \text{Equation 9}$$

$$\alpha_1 = a\tan(-\tan(\beta) + \tan(\alpha)) \qquad \text{Equation 10}$$

Exemplary values calculated using the above formulae for $\alpha=12°$, h=93 µm, L=76 µm and $\beta=10°$ follow. Note that the example shown in FIG. 13 uses the foregoing and following values:

$p_1(x,y)$ (−37.083 µm, −46.5 µm)
$p_2(x,y)$ (−0.917 µm, +46.5 µm)
$p_3(x,y)$ (−20.685 µm, −46.5 µm)
$p_4(x,y)$ (−17.315 µm, +46.5 µm)
$x_1$=8.199
$x_t$=18.232
$x_b$=57.768
$\alpha_1$=0.075°
$\alpha_2$=−21.25°

Advantages of the new servo pattern design described herein are many. For example, no y-position scaling is needed compared to prior-art rotated designs. Here the "A" and "B" count distances/estimates remain exactly the same, and so the formula to compute the y-position does not depend on $\beta$. The formula is:

$$y = \frac{L}{2\tan(\alpha)}\left(\frac{1}{2} - \frac{\text{"A"}}{\text{"B"}}\right) \qquad \text{Equation 11}$$

An additional advantage of the new servo pattern design presented herein is that there is no change in pattern height and therefore no loss in y-position range. Thus, the new servo pattern may be incorporated into existing tape specifications without change in dimensions of the servo track width.

The new servo pattern design is also easier to specify/calculate and has a symmetric range around the centerline. Moreover, the servo band-to-band alignment is relative to the median (e.g., 10 deg rotated) and not the angle bisector (half-angle line, 10 deg rotated) as in prior attempts at rotated design. This greatly simplifies top-bottom skew estimation.

Another advantage is that the new servo pattern design results in lower dibit readback distortion due to smaller $\alpha_2$ and larger $\alpha_1$.

Referring again to FIG. 12, the servo pattern may be created during a servo formatting processes via current pulses applied to a servo format head.

Figure 14:
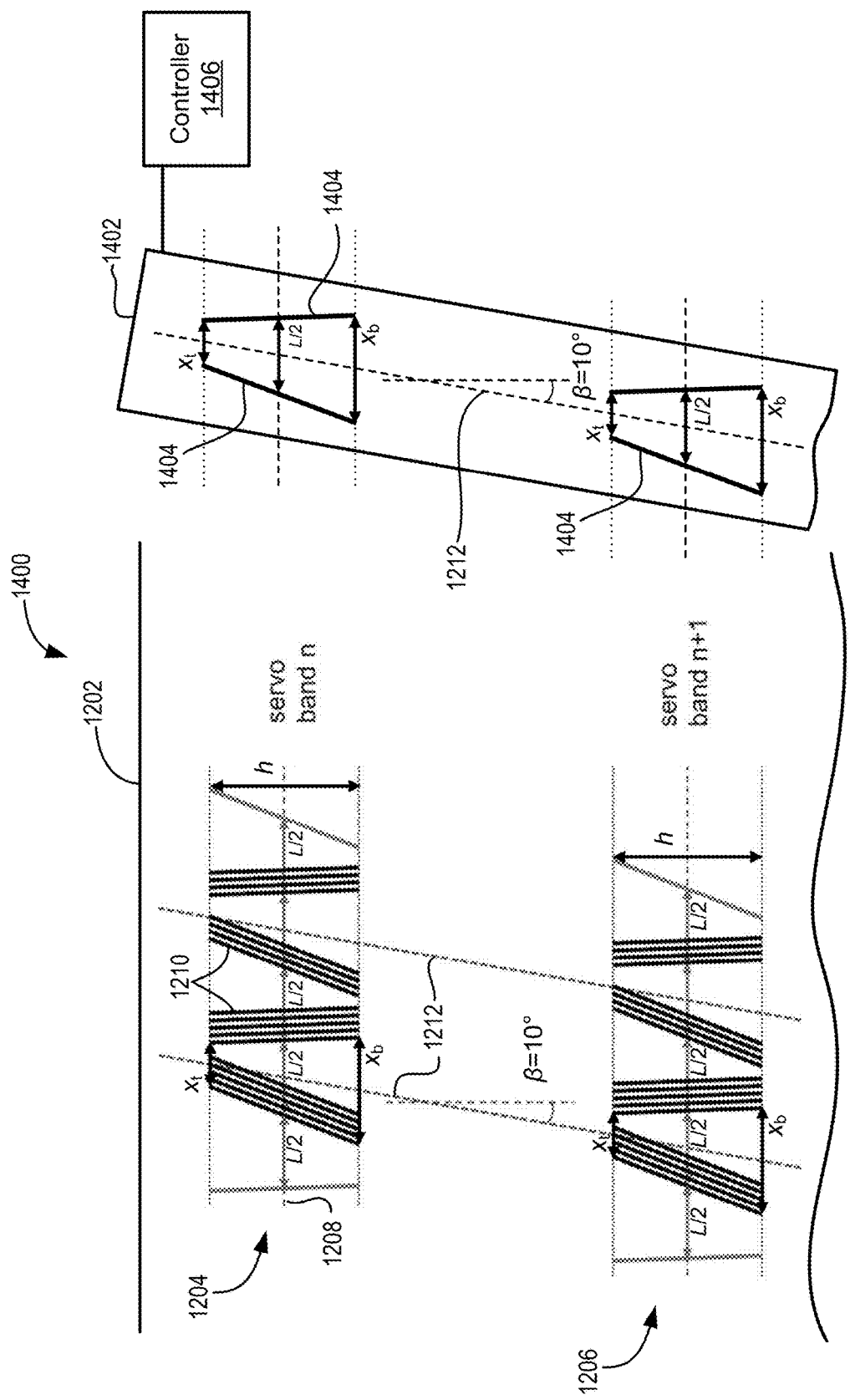
FIG. 14 is a schematic diagram of an apparatus for writing servo tracks on a magnetic recording tape, in accordance with one embodiment.

FIG. 14 depicts an apparatus 1400 for writing servo tracks on a magnetic recording tape, in accordance with one embodiment. As an option, the present apparatus 1400 may be implemented in conjunction with features from any other embodiment listed herein, such as those described with reference to the other FIGS. Of course, however, such apparatus 1400 and others presented herein may be used in various applications and/or in permutations which may or may not be specifically described in the illustrative embodiments listed herein. Further, the apparatus 1400 presented herein may be used in any desired environment.

The apparatus 1400 includes a servo write head 1402 having at least two write transducers 1404 positioned and configured to write parallel servo tracks 1204, 1206 along a longitudinal axis of the magnetic recording tape 1202, also shown in FIG. 14 to illustrate the resulting servo tracks. Preferably, the servo write head 1402 includes as many write transducers 1404 as servo tracks on the tape 1202, so that the entire tape 1202 can be formatted in one pass.

A controller 1406 is in communication with the servo write head 1402. The controller 1406 controls the movement of the tape 1202 and the writing of servo patterns on the tape 1202. The controller 1406 controls the tape speed and the write current pulses applied to the write transducers 1404 located in the servo write head 1402 in order to write the servo stripes that create the servo pattern. The controller 1406 may apply different write current pulses to the multiple write transducers 1404 located in the servo write head 1402 in order to encode different information into each servo pattern by means of linear position (LPOS) modulation. Other components of the apparatus may be similar to those of conventional servo writing apparatuses, the drive depicted in FIG. 2A, etc.

As shown, the servo write head 1402 is rotated to the desired angle $\beta$, relative the virtual median line 1212, to simultaneously write two or more servo patterns. As shown, the resulting frames in adjacent servo tracks are 1204, 1206 are aligned along the virtual median line 1212 for enabling the TDS compensation. The angle $\beta$ in this and other embodiments described herein is any desired angle greater than 1 degree, e.g., up to about 20 degrees, but preferably in a range of about 5 to about 15 degrees. The position of the servo write head 1402 is ideally fixed during servo formatting.

Each resulting servo track is preferably as described above with reference to FIGS. 12-13. For example, each servo track has a TBS pattern comprising a series of servo frames arranged to enable lateral positioning of a magnetic head relative to the servo tracks as well as tape dimensional stability (TDS) compensation via head-to-tape skew. Each frame includes a sequence of pairs of leading and trailing servo stripes. As described above with reference to FIGS. 12-13, midpoints between the servo stripes in each pair, at all points having a same relative lateral height on the tape, are located along a virtual median line oriented at the angle β from perpendicular to the longitudinal axis of the tape. Thus, the at least two write transducers are preferably positioned and configured to write the frames in adjacent ones of the servo tracks at positions such that one or more of the following is achieved: calculation of the lateral position of the head relative to the servo tracks does not depend on β; all servo stripes in the servo tracks have a same pattern height h as measured perpendicular to the longitudinal axis of the tape; distances $x_t$ and $x_b$ are calculated according to the formulae above; and so on.

Note that linear position (LPOS) modulation may be applied. Typically, LPOS modulation is applied to e.g., the 2nd and 4th stripe of 5-5 bursts. The data encoded via linear position modulation may contain e.g., longitudinal position information, manufacturing information, and unique servo band identifiers.

In use, the controller 1406 causes the apparatus 1400 to write the servo patterns using the servo write head 1402. More specifically, controller 1406 causes the apparatus 1400 to write the servo patterns using the write transducers 1404 located on the servo write head 1402.

An apparatus for performing data operations on a magnetic recording tape, such as writing and/or reading data, includes a magnetic head having at least two servo transducers positioned and configured to read parallel servo tracks of the type described herein and extending along a longitudinal axis of the magnetic recording tape, the magnetic head also having an array of data transducers for performing data operations on the magnetic recording tape. A controller is in communication with the magnetic head, the controller being configured to perform lateral positioning of the magnetic head relative to the servo tracks as well as perform TDS compensation via head skew based on signals from the servo transducer reading TBS patterns of the servo tracks. Preferably, the controller is configured not to use the angle β in a calculation to compute the lateral position of the magnetic head relative to the servo tracks. In one approach, the apparatus for performing data operations may be as described in conjunction with FIG. 2A, with the controller programmed as noted herein. In use, the controller causes the apparatus to perform track following using signals read from the servo patterns using the servo transducers while performing a data operation.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage product, comprising:
a magnetic recording tape having written thereon at least two servo tracks extending along a longitudinal axis of the tape,
each servo track having a timing-based servo (TBS) pattern comprising a series of servo frames arranged to enable lateral positioning of a magnetic head relative to the servo tracks as well as tape dimensional stability (TDS) compensation via head skew,
each frame comprising a sequence of pairs of leading and trailing servo stripes,
wherein midpoints between the servo stripes in each pair, at all points having a same relative lateral height on the tape, are located along a virtual median line oriented at an angle β from perpendicular to the longitudinal axis of the tape, the angle β being greater than 1 degree.

2. A data storage product as recited in claim 1, wherein the frames in adjacent ones of the servo tracks are aligned along the virtual median line for enabling the TDS compensation.

3. A data storage product as recited in claim 1, wherein the frames in adjacent ones of the servo tracks are positioned such that calculation of the lateral position of the head relative to the servo tracks does not depend on β.

4. A data storage product as recited in claim 1, wherein all servo stripes in the servo tracks have a same pattern height h as measured perpendicular to the longitudinal axis of the tape.

5. A data storage product as recited in claim 1, wherein a distance $x_t$ between topmost endpoints of each pair of servo stripes is calculated according to the following formula:

$$x_t = \frac{L}{2} - h\tan(\alpha)$$

where L is a subframe length,
h is a pattern height of the associated servo track, and
α is an equivalent azimuth angle of a nonrotated pair of servo stripes having topmost points aligned along the longitudinal axis of the tape, and bottommost points aligned along the longitudinal axis of the tape.

6. A data storage product as recited in claim 5, wherein a distance $x_b$ between bottommost endpoints of each pair of servo stripes is calculated according to the following formula:

$$x_b = \frac{L}{2} + h\tan(\alpha).$$

7. A data storage product as recited in claim 5, wherein a sum of a first angle $\alpha_1$, measured between a first of the servo stripes in each pair and a line perpendicular to the longitudinal axis of the tape, and a second angle $\alpha_2$, measured between a second of the servo stripes in the pair and the line perpendicular to the longitudinal axis of the tape, is not equal to $2*\alpha$.

8. A data storage product as recited in claim 1, wherein the servo stripes are positioned such that the angle β is not needed in a calculation to compute the lateral position of the magnetic head relative to the servo tracks.

9. A data storage product as recited in claim 1, comprising a cartridge housing, and a spool in the housing, the tape being wound around the spool.

10. An apparatus for writing servo tracks on a magnetic recording tape, the apparatus comprising:
- a servo write head having at least two write transducers positioned and configured to write parallel servo tracks along a longitudinal axis of the magnetic recording tape,
- each resulting servo track having a timing-based servo (TBS) pattern comprising a series of servo frames arranged to enable lateral positioning of a magnetic head relative to the servo tracks as well as tape dimensional stability (TDS) compensation via head skew,
- each frame comprising a sequence of pairs of leading and trailing servo stripes,
- wherein midpoints between the servo stripes in each pair, at all points having a same relative lateral height on the tape, are located along a virtual median line oriented at an angle β from perpendicular to the longitudinal axis of the tape, the angle β being greater than 1 degree.

11. An apparatus as recited in claim 10, wherein the at least two write transducers are positioned and configured to write the frames in adjacent ones of the servo tracks that are aligned along the virtual median line for enabling the TDS compensation.

12. An apparatus as recited in claim 10, wherein the at least two write transducers are positioned and configured to write the frames in adjacent ones of the servo tracks at positions such that calculation of the lateral position of the head relative to the servo tracks does not depend on β.

13. An apparatus as recited in claim 10, wherein the at least two write transducers are positioned and configured such that all servo stripes in the servo tracks have a same pattern height h as measured perpendicular to the longitudinal axis of the tape.

14. An apparatus as recited in claim 10, wherein the at least two write transducers are positioned and configured to write the servo tracks such that a distance $x_t$ between topmost endpoints of each pair of servo stripes is calculated according to the following formula:

$$x_t = \frac{L}{2} - h\tan(\alpha)$$

where L is a subframe length,
h is a pattern height of the associated servo track, and
α is an equivalent azimuth angle of a nonrotated pair of servo stripes having topmost points aligned along the longitudinal axis of the tape, and bottommost points aligned along the longitudinal axis of the tape.

15. An apparatus as recited in claim 14, wherein the at least two write transducers are positioned and configured to write the servo tracks such that a distance $x_b$ between bottommost endpoints of each pair of servo stripes is calculated according to the following formula:

$$x_b = \frac{L}{2} + h\tan(\alpha).$$

16. An apparatus as recited in claim 14, wherein the at least two write transducers are positioned and configured to write the servo tracks such that a sum of a first angle $\alpha_1$, measured between a first of the servo stripes in each pair and a line perpendicular to the longitudinal axis of the tape, and a second angle $\alpha_2$, measured between a second of the servo stripes in the pair and the line perpendicular to the longitudinal axis of the tape, is not equal to 2*α.

17. An apparatus as recited in claim 10, wherein the at least two write transducers are positioned and configured to write the servo tracks such that the servo stripes are positioned such that the angle β is not needed in a calculation to compute the lateral position of the magnetic head relative to the servo tracks.

18. An apparatus for performing data operations on a magnetic recording tape, the apparatus comprising:
- a magnetic head having at least two servo transducers positioned and configured to read parallel servo tracks extending along a longitudinal axis of the magnetic recording tape, the magnetic head also having an array of data transducers for performing data operations on the magnetic recording tape; and
- a controller in communication with the magnetic head, the controller being configured to perform lateral positioning of the magnetic head relative to the servo tracks as well as perform tape dimensional stability (TDS) compensation via head skew based on signals from the servo transducer reading timing-based servo (TBS) patterns of the servo tracks, each servo track comprising a series of servo frames arranged to enable the lateral positioning of a magnetic head relative to the servo tracks and the TDS compensation via head skew, wherein each servo frame comprising a sequence of pairs of leading and trailing servo stripes, wherein midpoints between the servo stripes in each pair, at all points having a same relative lateral height on the tape, are located along a virtual median line oriented at an angle β from perpendicular to the longitudinal axis of the tape, the angle β being greater than 1 degree.

19. An apparatus as recited in claim 18, wherein the controller is configured not to use the angle β in a calculation to compute the lateral position of the magnetic head relative to the servo tracks.

* * * * *